United States Patent [19]
Bortolin

[11] Patent Number: 4,583,769
[45] Date of Patent: Apr. 22, 1986

[54] HOSE COUPLING

[76] Inventor: Peter Bortolin, 4/10 Cannon St., Stanmore, New South Wales 2048, Australia

[21] Appl. No.: 619,063

[22] Filed: Jun. 11, 1984

[51] Int. Cl.$^4$ .................................... F16L 35/00
[52] U.S. Cl. .................................... 285/73; 285/174; 285/319; 285/331; 285/DIG. 22
[58] Field of Search ............. 285/73, 72, 71, 70, 285/DIG. 22, 331, 319, 174

[56] References Cited

U.S. PATENT DOCUMENTS

| Re. 4,344 | 4/1871 | Cooke | 285/70 |
| 1,196,680 | 8/1916 | Handoll | 285/70 |

FOREIGN PATENT DOCUMENTS

| 141374 | 1/1881 | France | 285/71 |
| 1442555 | 5/1966 | France | 285/73 |
| 29816 | of 1912 | United Kingdom | 285/70 |

Primary Examiner—Richard J. Scanlan, Jr.
Attorney, Agent, or Firm—Ladas & Parry

[57] ABSTRACT

A hose coupling through which extends a passage between two openings one of which is defined by a spigot and the other of which is defined by a sleeve, and wherein the spigot is of approximately the diameter of the spigot with the sleeve being adapted to receive a portion of hose to extend to the sleeve of an adjacent coupling so as to provide a sealing element joining two hose couplings which are attaching two hoses.

3 Claims, 1 Drawing Figure

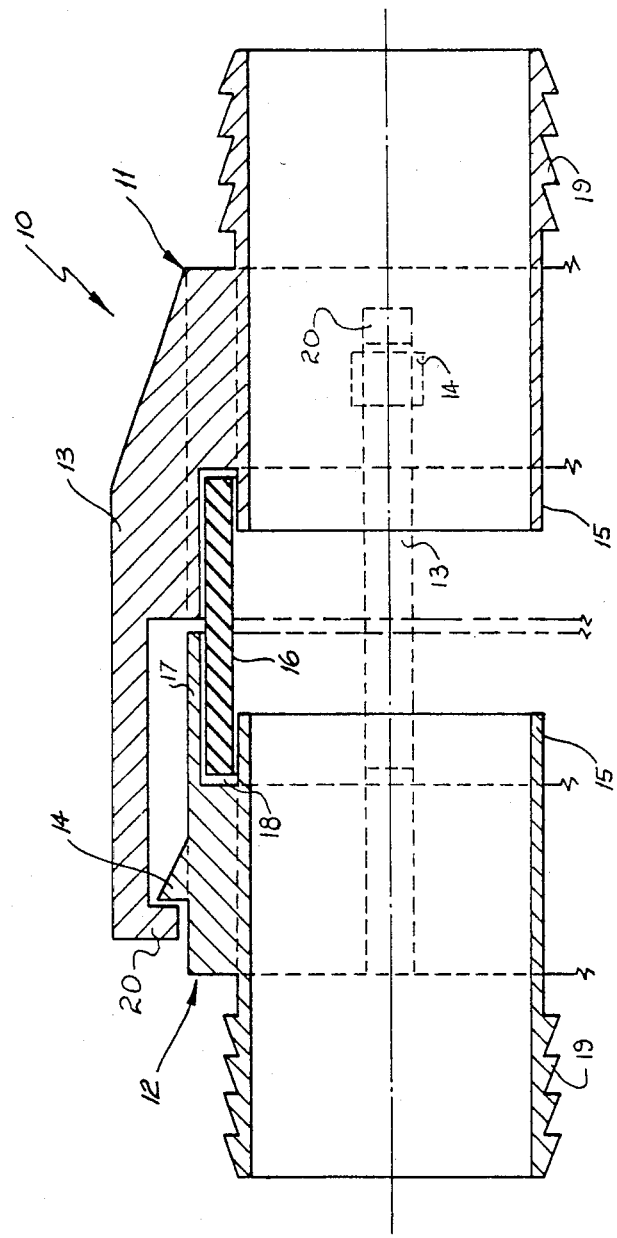

HOSE COUPLING

The present invention relates to hose couplings and more particularly but not exclusively to high pressure hose coupling used to join both pneumatic and hydraulic flexible hoses.

BACKGROUND ART

It is a disadvantages of known hose couplings that both a male and female coupling member are required to join the two lengths of hose. This duplicates a number of items to be manufactured stored and sold thereby increasing the cost of the items. Additionally when two hoses are to be joined the ends thereof must be of complimentary form if the two hoses are to be connected.

Although couplings have been proposed to overcome the problems set out above, these known couplings have generally acquired an "O" ring or such like sealing element to be sandwiched between the two hose couplings. This type of coupling has the disadvantage that often the sealing element becomes damaged or displaced and a further sealing element is not readily available.

It is the object of the present invention to overcome or substantially ameliorate the above disadvantages.

DISCLOSURE OF INVENTION

There is disclosed herein a hose coupling to be fixed to the end of a first hose to engage a further coupling of the same configuration fixed to the end of another hose so that the two hoses are sealingly connected when the couplings are engaged, said coupling comprising: a hollow body having a passage extending through it so as to terminate at one end in a first opening to communicate with the hose and at the other end in a second opening to face the other coupling, said body having a spigot defining said first opening, said spigot having an outer diameter to be fitted within the hose so as to be retained therein, a sleeve defining said second opening, said sleeve having substantially the same outer diameter as said spigot so as to receive a portion of hose to extend to the sleeve of the other coupling so as to sealingly connect the two couplings, and co-operating locking means to engage the locking means of the other coupling to prevent relative axial movement between the two couplings when in use.

BEST MODE OF CARRYING OUT THE INVENTION

A preferred form of the present invention will now be described by way of example with reference to the accompanying drawing wherein there is schematically depicted a joint 10 in a hose, which joint includes two identical hose couplings 11 and 12 which are fixed to the extremities of two hose portions to be connected. Each hose coupling 11 and 12 has a barbed spigot 19 having an external diameter to co-operate with the hose portions so that the hose portions are retained on the spigot 19. Coaxial with the spigot 19 is a sleeve 15 also having an outer diameter approximately equal to the outer diameter of the spigots 19 so that a portion 16 of the hose may extend between the two sleeves 15 so as to sealingly couple the two couplings 11 and 12. Surrounding the sleeves 15 are two annular flanges 17 against which the hose portions 16 would be biased under the internal pressure of the hose so as to sealingly couple the two hose portions. Accordingly there is defined by the sleeve 15 an annular flange 17 an annular cavity 18 which receives an end portion of the hose portion 16.

There is also provided on each hose coupling 11 and 12 a plurality of angularly spaced abutments 14 which are engaged by equally angularly spaced arms 13 which have a step end 20 having an abutment surface to engage the abutments 14 so as to prevent axial movement between the two couplings 11 and 12. In use the couplings 11 and 12 would be rotated relatively in opposite directions about their longitudinal axis so as to bring the abutments 14 into engagement with the arm 13.

It is an advantage of the above described preferred embodiment of the present invention, that the hose portion 16 may merely be a portion of the hose to be fixed to the spigots 19 and accordingly the availability of a sealing member such as the hose portion 16 is of no problem. Additionally in use the hose portion 16 would be biased radially upwardly to engage the annular flange 17 to thereby provide a sealed joint.

What I claim is:

1. A hose coupling fixed to the end of a first hose engaging a further coupling of the same configuration fixed to the end of another hose so that the two hoses are sealingly connected, said coupling comprising: a hollow body having a passage extending through it so as to terminate at one end in a first opening communicating with the hose and at the other end in a second opening facing the other coupling, said body having a spigot defining said first opening, said spigot having an outer diameter fitted within the end of the hose so as to to be retained therein, a sleeve defining said second opening, said sleeve having substantially the same outer diameter as said spigot and receiving a portion of hose extending to and over the sleeve of the other coupling so as to sealingly connect the two couplings, said body also having an annular flange co-axial and co-extensive with said sleeve and surrounding said sleeve so as to define an annular cavity between the sleeve and annular flange receiving the hose portion, cooperating locking means engaging the locking means of the other coupling preventing relative axial movement between the two couplings when in use, and wherein said flange projects longitudinally beyond said sleeve so as to support said hose portion between said couplings via cooperation of the flange of said other coupling.

2. The hose coupling of claim 1, wherein said flange projects beyond said sleeve a sufficient distance and abuts the sleeve of said other coupling when the couplings are engaged.

3. The hose coupling of claim 2 wherein said body has a plurality of angularly spaced abutments and a plurality of longitudinally extending arms with the arms being positioned relative to the abutments so that the arms engage the abutments of the other coupling so as to prevent axial movement between the two hose couplings.

* * * * *